United States Patent [19]

Blessinger

[11] Patent Number: 5,140,436
[45] Date of Patent: Aug. 18, 1992

[54] PRE-EVENT/POST-EVENT RECORDING IN A SOLID STATE FAST FRAME RECORDER

[75] Inventor: Kurt V. Blessinger, Vista, Calif.

[73] Assignee: Eastman Kodak Company, Rochester, N.Y.

[21] Appl. No.: 431,010

[22] Filed: Nov. 2, 1989

[51] Int. Cl.⁵ .................................................. H04N 5/907
[52] U.S. Cl. ........................................ 358/335; 360/5; 360/33.1
[58] Field of Search ............ 358/335, 213.13, 213.12, 358/213.11, 213.26, 213.27, 213.28, 213.39, 108; 360/33.1, 35.1, 5

[56] References Cited

U.S. PATENT DOCUMENTS

| | | |
|---|---|---|
| 2,943,141 | 6/1960 | Knight . |
| 3,885,090 | 5/1975 | Rosenbaum .............................. 360/5 |
| 4,280,151 | 7/1981 | Tsnnekawa et al. . |
| 4,281,354 | 7/1981 | Conte ........................................ 360/5 |
| 4,420,773 | 12/1983 | Toyoda et al. . |
| 4,456,931 | 6/1984 | Toyoda et al. . |
| 4,489,351 | 12/1984 | d'Alayer de Costemore d'Arc . |
| 4,496,995 | 1/1985 | Colles et al. ........................... 360/9.1 |
| 4,593,313 | 6/1986 | Nagasaki et al. . |
| 4,621,335 | 11/1986 | Bluish et al. ............................ 360/5 |
| 4,630,111 | 12/1986 | Blain et al. . |
| 4,794,566 | 12/1988 | Richards et al. ...................... 365/189 |
| 4,837,628 | 6/1989 | Sasaki . |

FOREIGN PATENT DOCUMENTS

| | | |
|---|---|---|
| 0184138 | 11/1985 | European Pat. Off. . |
| 0212784 | 5/1986 | European Pat. Off. . |
| 0279549 | 2/1988 | European Pat. Off. . |
| 2144953 | 5/1972 | Fed. Rep. of Germany . |
| 2219330 | 11/1973 | Fed. Rep. of Germany . |
| 8805244 | 7/1988 | World Int. Prop. O. . |

OTHER PUBLICATIONS

D. J. Woodham, "A Solid State 'Action Replay' Recorder", Jun. 17-22, 1989, pp. 289-295.
Patent Abstracts of Japan, vol. 12, No. 281 (E-641)(3128), 2 Aug. 1988, and JP, A, 6359074 (Omron Tateisi Electronics Co.) 14 Mar. 1988.
Patent Abstracts of Japan, vol. 8, No. 103, (E-244)(1540), 15 May 1984, and JP, A, 5919472 (Yoshiharu Morimoto) 31 Jan. 1984.

Primary Examiner—Roy N. Envall, Jr.
Assistant Examiner—Huy Nguyen
Attorney, Agent, or Firm—William F. Noval

[57] ABSTRACT

A fast frame recorder records images of an event at a fast frame rate and plays back the images at a slower frame rate to facilitate analysis of the event. Disclosed is a fast frame recorder having solid state memory capable of continuously recording an event in a circular or FIFO format until an external trigger terminates recording. By varying the delay of the external trigger, the number of image frames recorded before and after the triggering event may be varied.

2 Claims, 4 Drawing Sheets

PRE-EVENT/POST-EVENT RECORDING IN A SOLID STATE FAST FRAME RECORDER

BACKGROUND OF THE INVENTION

This invention relates in general to a fast frame recorder which records an event at a fast frame rate and plays back the event at a slower frame rate so that the event may be analyzed. More particularly, this invention relates to a fast frame recorder having a solid state memory which has a variable pre-event/post-event recording capability.

Fast frame recorders are useful for motion analysis of an event. A fast frame recorder records a great number of images during an event at a high or fast image frame rate and reproduces the image frames more slowly at a lower frame rate. Thus, any movement occurring during the event may be analyzed in a step-by-step progression. Applications for a fast frame recorder include, malfunctions in high speed machinery, movements of an athlete, testing of safety equipment, shattering an object, etc. One type of fast frame recorder is disclosed in commonly assigned U.S. Pat. No. 4,496,995, issued Jan. 29, 1985. As disclosed in the latter patent, the fast frame recorder-motion analyzer includes a video camera, a variable speed magnetic tape processor and a video display monitor. The camera is read out in block format so that a plurality of lines of video information that correspond to rows of photosites in the camera solid state imager are simultaneously recorded on magnetic tape in parallel longitudinal tracks. During play back, the magnetic tape is played back at a reduced tape speed. A plurality of parallel video signals reproduced from a plurality of parallel tracks on the tape, are processed into a serial video signal which may be used with standard video monitors. Although a magnetic tape, fast frame recorder is advantageous because of its ability to record a large number of image frames and because of the non-volatility of the image storage, there are limitations to magnetic tape recording. Such a fast frame recorder tends to be costly since, in recording and reproducing a plurality of parallel video signals, separate record and reproduce signal processing circuitry must be provided for each video signal channel. Since the video signals are recorded directly on magnetic tape in an analog format, picture quality is degraded significantly due to induced flutter and other noise, due to reduced bandwidth and increased phase distortion and due to imprecisely recorded pixel signal values.

Flutter is the change in video signal caused by variations of tape speed relative to the record and playback magnetic heads. Flutter displays itself on a video monitor as vertical bands of light and dark superimposed over the video. These bands tend to change intensity and position and appear to flutter about the screen during playback. The degree of flutter caused during playback directly effects the intensity and degree of annoyance of light and dark bands of the video display. The degree of flutter will vary from recorder to recorder because of the sensitivity to mechanical tolerance buildup, tape and transport wear and environment. Large amounts of flutter will be introduced when the magnetic tape transport is subjected to shock or vibration during recording or playback.

Besides the image degradation caused by flutter, there are other types of noise that effect the quality of video in a magnetic tape recording system. Tape media has a graininess associated with it that will limit the dynamic range of a recorded analog signal. This graininess can be associated with hiss or snow as displayed on a monitor. Moreover, imperfections in the tape media known as dropouts will result in gaps of missing video. These gaps can be anywhere from a small segment of an image frame to many image frames in size. In addition, electronic noise is injected into a video signal because of analog recording. This particular type of noise is significant and difficult to reduce because of the low level of analog signals being processed. Electronic noise also appears as snow on a monitor and adds to the overall snow content present. As the snow content becomes larger relative to the picture information, there is a reduction in contrast of the pictures.

Limited bandwidth and phase distortion result from trying to get the highest possible frame record rate given the limitations of the write rate and tape speed. This distortion shows on the monitor as a blurring or smearing of image boundaries that are vertically oriented and is particularly evident at extreme edge transitions of black to white or white to black.

In many applications requiring the use of a fast frame recorder, the event to be recorded is random in nature and may occur at any moment during an extended period of time. Due to the inherent recording length constraints of a magnetic tape fast frame recorder, its ability to capture a randomly occurring event may require the recording of a large number of image frames which are unnecessary for the analysis of the event. During playback, the unwanted images must be scanned before images relating to the event can be analyzed, resulting in a waste of time, money and recording tape.

SUMMARY OF THE INVENTION

According to the present invention, there is provided a fast frame recorder which minimizes the limitations of magnetic tape fast frame recorders. According to an aspect of the present invention, a fast frame recorder includes solid state memory for toring a plurality of image frames produced by a solid state image sensor wherein picture degradation produced by flutter of a magnetic tape fast frame recorder is eliminated and wherein dropouts are minimized to single pixel events. According to another aspect of the present invention, video information representing image frames are recorded in digital format in the solid state memory, thus inherently eliminating media noise and electronic noise associated with tape recording. Moreover, bandwidth limitations and phase distortion produced in magnetic tape recording systems is minimized by digital storage of image frames. The solid state fast frame recorder of the present invention is substantially immune to shock and vibration and to environmental conditions such as temperature and humidity.

According to a further aspect of the present invention, a solid state fast frame recorder continuously records an event in a circular or FIFO format until an external trigger terminates recording. The external trigger stops storage of image frames in solid state memory upon detection of a physical phenomena unique to the event being recorded. By delaying the signal to stop recording, image frames before (preevent) and after (postevent) the triggering event may be stored.

DESCRIPTION OF THE DRAWINGS

In a detailed description of a preferred embodiment of the invention presented below, reference is made to the accompanying drawings in which like numerals refer to like elements.

DETAILED DESCRIPTION OF THE PREFERRED EMBODIMENT

Figure 1:
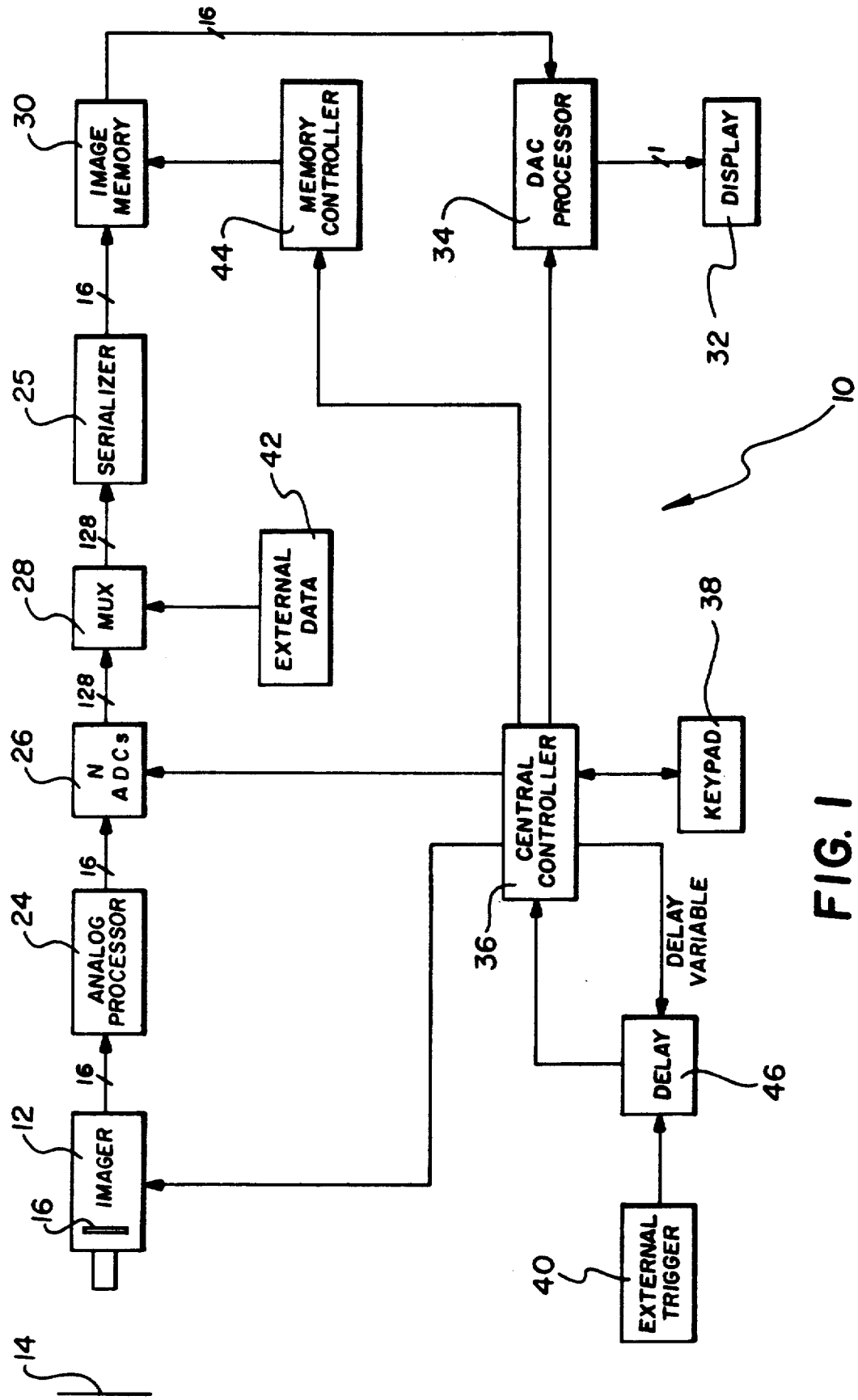
FIG. 1 is a block diagram of a preferred embodiment of the solid state fast frame recorder of the present invention.

Referring now to FIG. 1, there will be described a preferred embodiment of the solid state fast frame recorder of the present invention. As shown in FIG. 1, fast frame recorder 10 includes solid state imager 12 which images an event, such as scene 14, by means of a solid state, area imager 16. Imager 12 is controlled by central controller circuit 36 which supplies suitable control signals to imager 12 as a function of operator selectable frame rate and exposure time parameters. Imager 12 may operate, for example, at frame rates of 1 to 1,000 frames per second.

Figure 2:
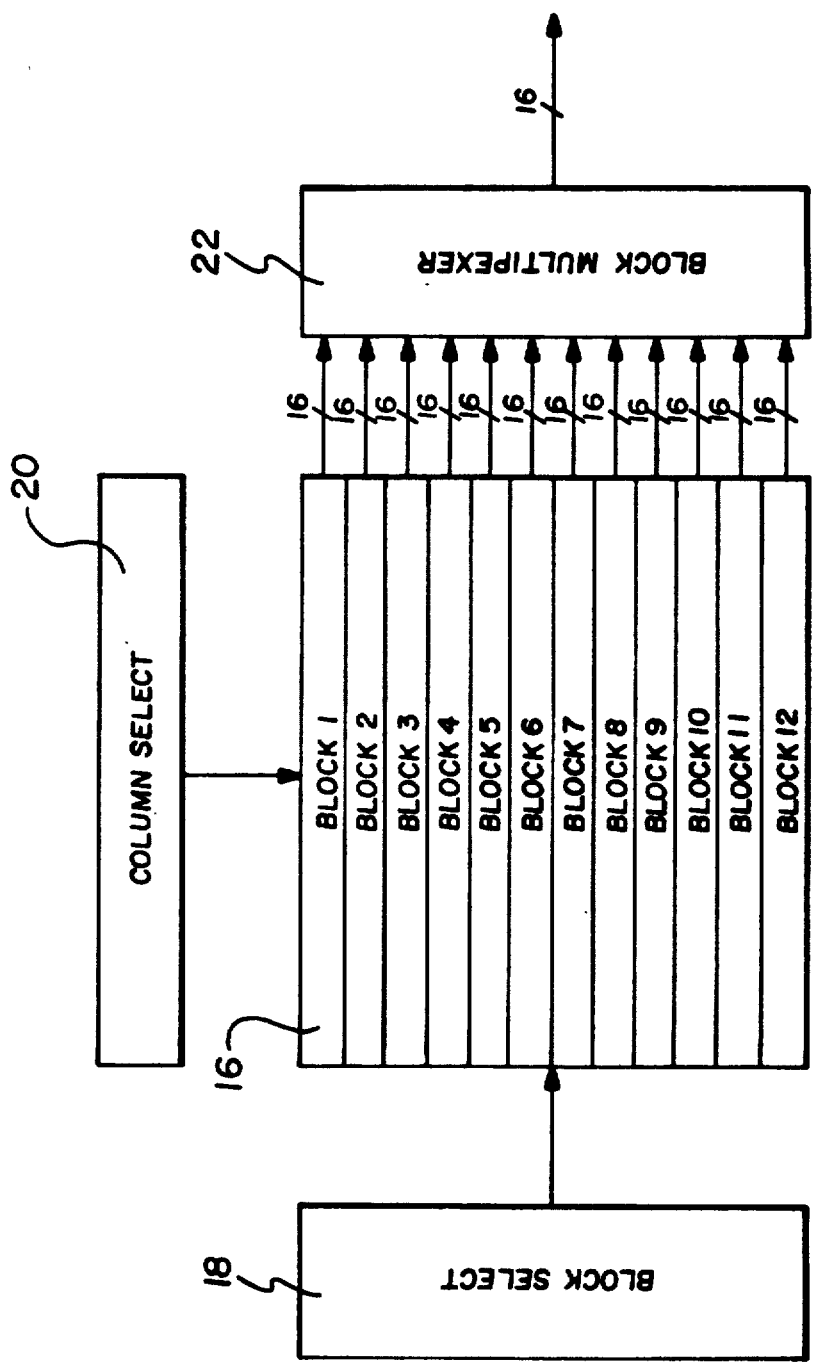
FIG. 2 is a functional block schematic diagram of a block readable image sensor.

Image sensor 16 is preferably a block "readable" area image sensor. The basic concept of a block readout of a solid state area image sensor and the timing and control thereof is disclosed in U.S. Pat. No. 4,322,752 in the name of James A. Bixby. Although the referenced patent provides detailed information, a brief description of the concept of block readout may be illustrated with respect to FIG. 2. FIG. 2 shows a block readable sensor 16 that includes an array of photosites (not individually shown) arranged in rows and columns. For purposes of readout, sensor 16 is schematically shown as being formatted into 12 blocks of 16 photosite rows in each block. Through appropriate control circuitry including block select circuit 18 and column select circuit 20, blocks 1-12 of sensor 16 are sequentially read out as parallel rows of photosites to block multiplexer circuit 22. Multiplexer 22 produces an image frame signal which includes sequential blocks of video information wherein each block of video information includes (16) parallel lines of video signals.

The parallel lines of video signals from multiplexer 22 are amplified and conditioned in analog processor 24 for preparation to be digitized. These parallel analog signals from analog processor 24 are converted into digital signals in ADC 26 by an Analog to Digital converter on each parallel signal line. Each ADC will output n parallel signal lines where n is equal to it's bit conversion size. Therefore, the number of output lines of ADC 26 will be n times the number of parallel lines of video signals. For example, if the number N of parallel video signals is "16" and the bit conversation number n is "8", the number of signal lines from ADC 26 is "128".

The multiplicity of signal lines from ADC 26 are converted to a more manageable number by the serializer 25. The serializer takes the n parallel lines associated with each ADC and converts the information on them into a bit serial format on one line. Therefore in this example, after serialization, there are the same number of parallel digital signal lines as there are parallel analog signal lines.

External data signals from source 42 are temporally associated with an image frame by inserting them in multiplexer 28 as a header or trailer with the image frame signals from ADC 26. These combined signals are then serialized in serializer 25 and stored in an image frame location in solid state image memory 30.

Image memory 30 is made up of a number of solid state Random Access Memory devices such as DRAMs or SRAMs. Inherently, to store information in RAM, a location needs to be addressed and then the information written to their input port. Subsequently, to retrieve the information back the location is re-addressed and then the information is read from the output port. Memory controller 44 is used to give order to the random access capability of RAM. When recording, it generates the address signals to the RAM in a known, fixed sequential format. Most importantly, this format is circular; once Image Memory 30 is full (can not store another image frame in a unique location) the RAM generator repeats the sequence of address signals thereby recording the newest image frame over the oldest. Visual analysis is accomplished when, during playback, the address signals are repeated in the same sequential format, but at a slower rate while Memory 30 is read.

Memory 30 may have a storage capacity of any size but should be large enough to store a sufficient number of image frames to capture an event in totality for later analysis. As an example, if an image frame plus external data information forms a display matrix of 256×256 pixels and each pixel is represented by 8 bits of information, each image frame stored in memory 30 occupies approximately 65 kilobytes of memory. If 1,000 image frames were to be stored, then memory 30 must have approximately 65 megabytes of solid state memory storage.

Image frames stored in memory 30 are displayed on monitor 32 by converting the digital image frame signal into an analog image frame signal by means of digital to analog converter processor (DAC) 34. Processor 34 extracts external data and displays them in a border around the image frame on display monitor 32. Central controller circuit 36 controls image memory 30 and processor 34 to vary the frame rate of playback on display monitor 32.

Key pad 38 has suitable switches and controls to input data into control circuit 36 to control the operation of fast frame recorder 10. According to an aspect of the present invention, fast frame recorder 10 is operable in a preevent/postevent trigger recording mode. Thus, recorder 10 continuously records (in a circular or FIFO (First In, First Out) format) image frames of an event produced by imager 12. When memory 30 is full, new image frames produced by imager 12 are recorded over the oldest image frames in memory 30. In order to stop recording, external trigger circuit 40 produces a trigger signal in response to an external event to stop recorder 10 from storing image frames in memory 30. Trigger 40 detects physical phenomena unique to the event to be recorded. The phenomena that sets the trigger can be as simple as a flash, switch closure, sound, temperature or a voltage change. The trigger could become more complicated by requiring a combination of the above, either simultaneously or in sequential order. At the time fast frame recorder 10 is triggered to stop, memory 30 will hold the sequence of image frames that depict the event prior to the trigger. As the image frames captured in memory 30 are played back on display monitor 32 in reverse order of recording, the event is played back in time, until the image frame where the trigger occurred is repeated. .

According to the present invention, a variable delay is provided by delay circuit 46 to stop recording after a trigger signal is produced by external trigger 40. Thus, a variable number of image frames before and after the triggering event may be recorded in memory 30.

Figure 3A:
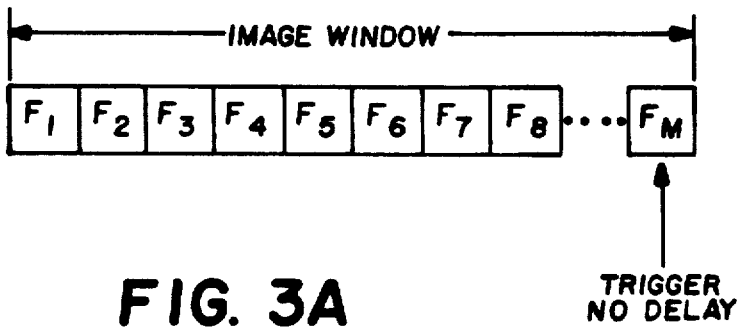
FIGS. 3A, 3B and 3C are diagrammatic showings useful in describing the operation of the embodiment of FIG. 1.
Figure 3B:
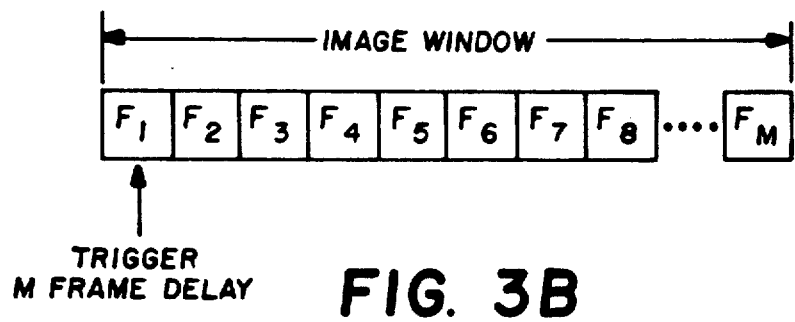
Figure 3C:
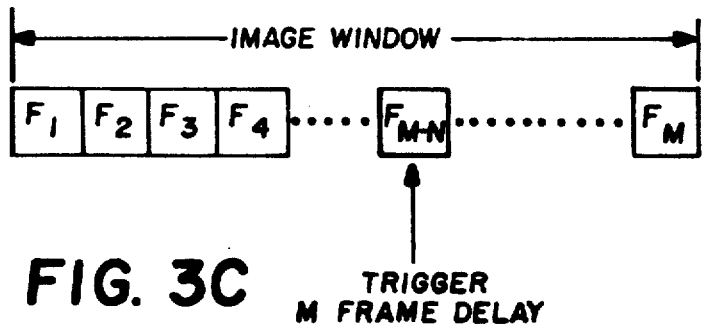
Figure 4:
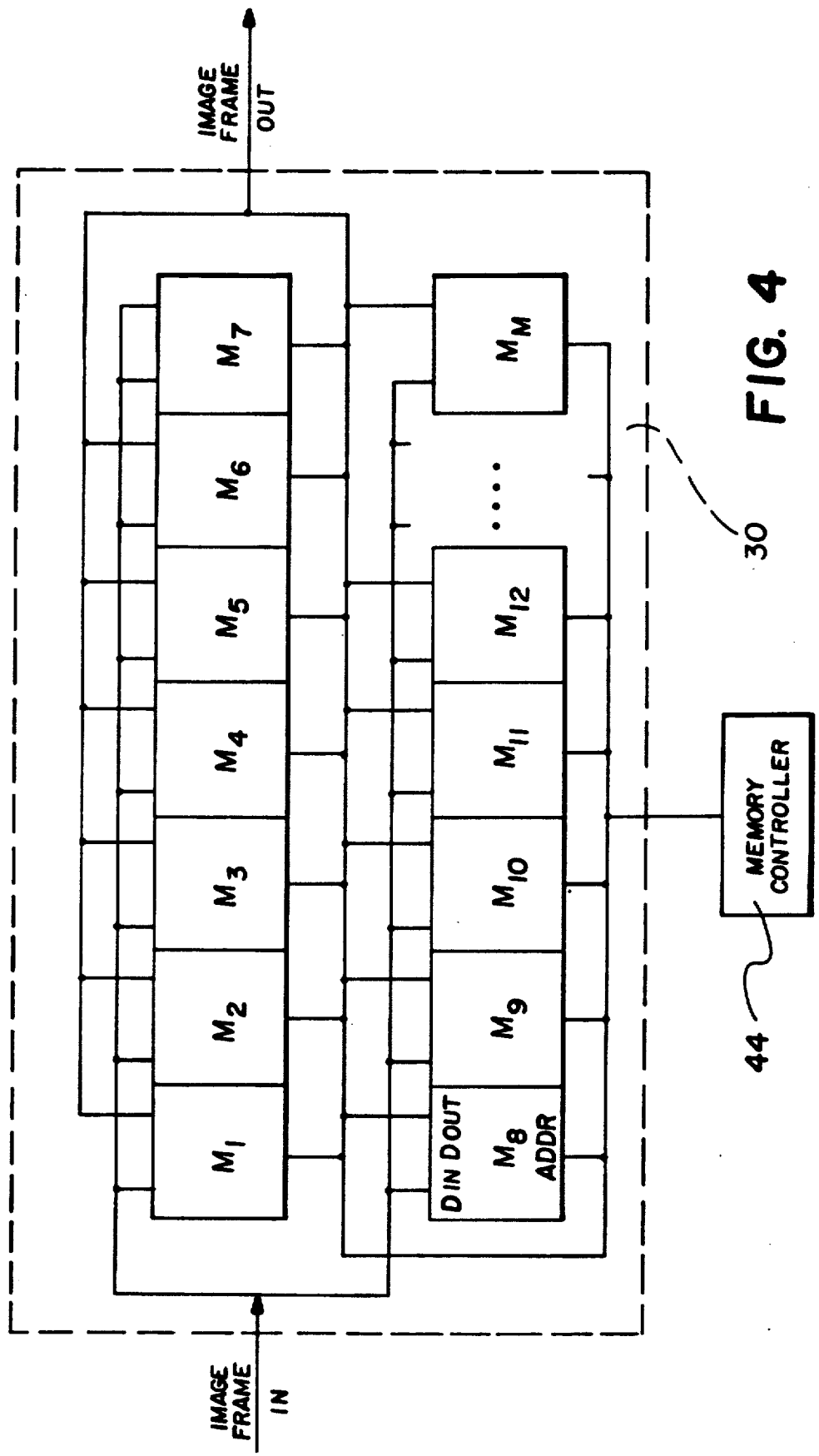
FIG. 4 is a functional block schematic diagram of the solid state memory of the embodiment of FIG. 1.

Operation of fast frame recorder 10 in the variable trigger mode may be understood with reference to FIGS. 3A-3C and FIG. 4. In FIG. 4, memory 30 is shown as comprising M image frame locations numbered $M_1$ to $M_M$. In FIG. 3A, it is assumed that fast frame recorder 10 has been operating continuously and that the image frame locations $M_1$-$M_M$ in image memory 30 are filled up with image frames. At the time that external trigger 40 is triggered, if there is no delay in the trigger signal to stop recording, fast frame recorder 10 will be triggered to stop recording and memory 30 stores image frames from the point of trigger back in time to the storage capacity M of memory 30. Thus, image frames $F_1$-$F_M$ before and including the event will be stored in memory 30.

FIG. 3B illustrates the case where the trigger signal to stop recording is delayed M image frames after the trigger 40 is actuated. The trigger signal to stop recorder 10 will be delayed M image frame periods so that image frames $F_1$ to $F_M$, after and including the triggering frame period, will be stored in memory 30.

FIG. 3C illustrates the case where the trigger signal to stop recording is delayed N frame periods. In such case, if the trigger 40 is actuated at frame period $F_{M-N}$ and the trigger signal to stop recording is delayed N frame periods, memory 30 will store N image frames after actuation of trigger 40 and M minus N image frames before actuation of trigger 40.

By varying the delay of the trigger signal to stop recording from 0 to M image frames, the image window, i.e., the total recording time, will cover the trigger point from M images before the trigger to M images after the trigger. This pre-event/post-event trigger capability allows the capture of a random occurring event. A typical scenario would be as follows: fast frame recorder 10 is set up to view some process and a trigger 40 is provided to activate when an abnormal event occurs. The fast frame recorder 10 is operated to continuously record image frames into memory 30 for an indefinite time. At some random time, the abnormal event occurs which then actuates trigger 40 to stop fast frame recorder 10 from storing image frames. If the trigger stopping signal is set to delay N frames, then recorder 10 will wait N frames before stopping to store images. Thus, memory 30 will store frames from both before and after the triggering event, as well as a frame which shows what happened precisely at the time of trigger. In this manner, the random abnormal event will always be captured as long as trigger 40 is actuated.

Although a preferred embodiment of the present invention has been described above, variations and modifications thereof will be evident to one skilled in the art. Thus, for example, fast frame recorder 10 can record at one frame rate and can play back at the same or a faster or slower frame rate. Moreover, the image frames recorded in memory 30 can be played back on display monitor 32 in the same sequence as they were recorded, or in a random sequence.

Although the invention has been described in detail with particular reference to a preferred embodiment thereof, it will be understood that variations and modifications can be effected within the spirit and scope of the invention as described above and as defined in the appended claims.

What is claimed is:

1. A fast frame recorder comprising:
   solid state image sensor means for sensing an image of an event;
   means for selectively reading out said sensor means to produce image frame signals at a plurality of frame rates F up to several hundred frames per second, wherein each of said image frame signals has a frame period 1/F;
   solid state memory means connected to said sensor means, having a capacity for storing a plurality of image frame signals produced by said image sensor means;
   trigger means for producing a trigger signal in response to an external event;
   control means for controlling said memory means (1) to continuously store image frame signals produced by said sensor means, such that when the capacity of said memory means is full, the newest image frame signal is stored over the oldest image frame signal, and (2) to stop image frame signals when a trigger signal is received from said trigger means; and
   programmable delay means which is programmable to delay by a selectable number of image frame periods the application of said trigger signal to said control means so that said memory means stores image frames from both before and after the triggering event, wherein said number of image frame periods selected is independent of the image sensor frame rate F selected but the delay period is a function of the frame rate selected.

2. The recorder of claim 1 wherein said solid state image sensor means includes a plurality of photosites arranged in an array of rows and columns and wherein said reading out means reads out said sensor means in sequential blocks of parallel subsets of photosites, to produce an image frame signal including sequential blocks of video information, wherein each block of video information includes parallel lines of video signals.

* * * * *